Sept. 16, 1924.
E. PARRADEE
VEHICLE BUMPER
Filed Dec. 24, 1923
1,509,054
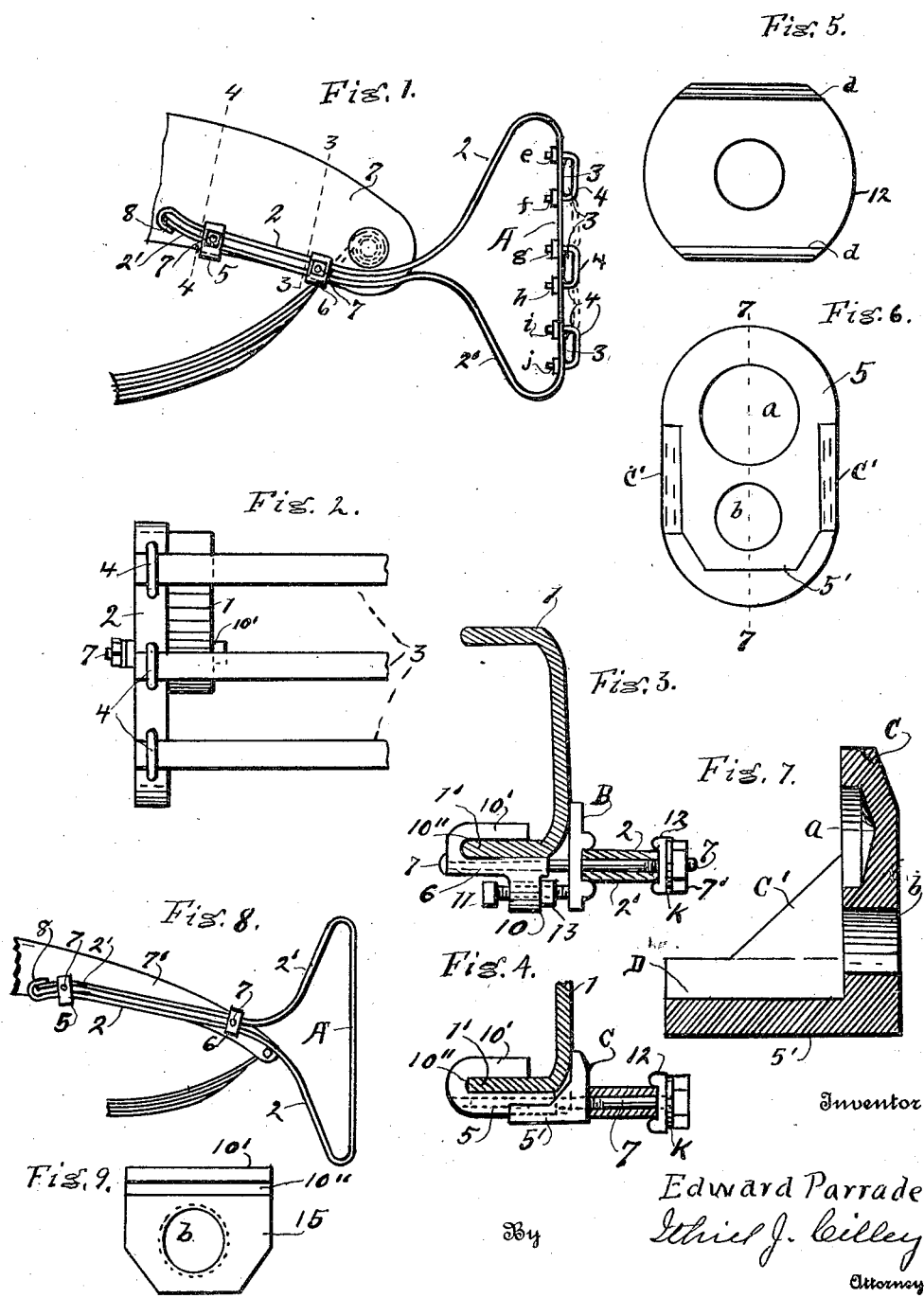
Inventor
Edward Parradee
By Ithiel J. Cilley
Attorney Patented Sept. 16, 1924.

1,509,054

UNITED STATES PATENT OFFICE.

EDWARD PARRADEE, OF GRAND RAPIDS, MICHIGAN.

VEHICLE BUMPER.

Application filed December 24, 1923. Serial No. 682,512.

*To all whom it may concern:*

Be it known that I, EDWARD PARRADEE, a citizen of the United States, residing at Grand Rapids, in the county of Kent and State of Michigan, have invented certain new and useful Improvements in Vehicle Bumpers, of which the following is a specification.

My invention relates to improvements in bumpers, or buffers for use upon motor driven vehicles, and especially upon automobiles, and its objects are: first, to provide a means whereby one or more shield bars may be attached to the supports; second, to provide a means whereby the bumper supports may be readily secured upon, or detached from the vehicle frame; third, to provide a means whereby the bumper supports may be so set as to vary the distance between the cross bars and the body of the vehicle; fourth, to provide a means for producing the greatest amount of resiliency with the least possible danger of breaking the supports, and, fifth, to provide a bumper support that may be used either way upward.

I attain these objects by the construction of parts shown in the accompanying drawing, in which Fig. 1 is a side elevation of my device as attached to the lower edge of an automobile frame. Fig. 2 is a front elevation of one end of by bumper. Fig. 3 is a sectional elevation of one rail of an automobile frame, practically on the line 3—3 of Fig. 1, with the front supporting yoke in place. Fig. 4 is a like view on the line 4—4 of Fig. 1, with the back supporting yoke in place. Fig. 5 is an elevation of a full sized washer for engaging the outer edges of the support arms. Fig. 6 is a like view of the inside support used at the ends of the support arms. Fig. 7 is a sectional elevation of this support on the line 7—7 of Fig. 6. Fig. 8 is an elevation of one end of a modified form of automobile frame with my device shown secured diagonally across the rail and turned the other side up from that shown in Fig. 1, and Fig. 9 is a front end elevation of the hook member of the support shown in Fig. 4.

Similar reference characters indicate similar parts throughout the several views.

In the construction of my bumper supports I make use of a bar of flat, heavy spring plate for each support, with this bar I form a front vertically disposed receiving body A, curved backwardly at the upper and the lower ends with arms 2 and 2' approaching each other and extending backwardly and located far enough apart for the free passage of the bolts 7 between them. The extreme end of one of these arms, as 2, is bent to form a U-shaped receptacle for the corresponding end of the other arm, as 2', as indicated at 8, for the purpose of averting all danger of the ends of these arms spreading apart.

To secure these supports to the automobile frame, 1, I provide two brackets, 5, and 6, made practically of the forms shown in Figs. 3 and 4. In Fig. 3 I have shown the form of bracket used at the front end of the frame beam 1, which consists of the body part 6 bent around parallel, as at 10' forming a receiving slot 10'' for the edge 1' of the frame beam 1. Protruding downwardly from the body 6 is a lug 10 through which the bolt 11 is screwed and the end adjusted to bear against the back surface of the washer B to hold the washer in proper alinement with the face of the body frame beam 1, as indicated in Fig. 3. I, also, provide this bolt with a jamb nut 13 to avert any possibility of its being jarred loose from the movements of the automobile. I then pass a bolt 7 through the body 6, of sufficient length to protrude far enough beyond the washer B to receive the arms, 2 and 2' of the support, and the washer 12, and the nut 7' by means of which the arms 2—2' are firmly clamped to the frame beam 1. At $k$ I have indicated an ordinary lock washer between the nut 7' and the surface of the washer 12 to avert the danger of the bolt or the nut becoming loose from the constant jar of the automobile. In Fig. 4 I have shown the form of bracket used at or near the ends of the arms 2—2', which consists of the body part 5, with the hook 10' formed thereon to form the slot 10'' for the reception of the flange 1' of the beam 1, and of a sliding body 5' that has a right angled, upwardly extending integral washer member C that extends upwardly far enough to provide an ample bearing upon the face of the beam 1, as shown. This member has a hole $b$ through it for the passage of the bolt 7, see Figs. 6 and 7, which is made to screw through an opening in the body 5 for securing the ends of the arms 2—2', as follows: When the bolt 7 has been properly placed in the body 5 with the arms 2—2' in position each side of the bolt and the washer 12 in place, the bolt 7 is screwed firmly into the body 5 and the arms clamped firmly between the washers C and 12. The opening $a$ in the surface of the member C is designed to receive a bolt head if one should chance to be located in such a position upon the beam 1 as would require it, which I find often occurs. At C' I have shown a brace like side bearing, and at D I have shown the bearings designed to contact the outer or lower surfaces of the body 5. The ribs $d$—$d$, upon the surface of the washers 12 are designed to crowd the arms 2—2' firmly upon the bolt 7 when the latter is screwed firmly into place.

One of the principal advantages gained by the use of these supports consists in the ability to use one, two or three cross bars, 3, upon the bumper. When using but one cross bar the other two bars, and their supporting bolts may be removed and but the one bar retained. When but two cross bars are used, the center bar may be removed and the two outside bars retained, or, if desired, the center bar may be removed, and the upper bar placed between $f$ and $g$, and the staple or bolt at the upper end removed from the hole at $e$ and entered into the holes $f$ and $g$, and the lower bar removed to position between $i$ and $j$ and the staples entered at $h$ and $i$. Or the staples may be adjusted in the openings $e$, $f$, $g$, $h$, $i$ and $j$ to adjust the bars as desired.

In Fig. 8 I have shown the bracket 5 as secured to the lower edge of the beam 1, and the bracket 6 as secured to the upper edge of the beam, and the support as reversed, or turned upside down as compared with that in Fig. 1.

I bend the extreme ends of the arms 2 and 2' from a directly straight line, as shown in Figs. 1 and 8 for the purpose of providing a means whereby the height of the forward end of the supports may be varied, in short, whereby the bumper bars may be raised and lowered by drawing the supports forwardly, or backwardly; as for instance, if the support in Fig. 1 is drawn forwardly, the bracket 5 being left undisturbed the upward tendency of the ends of the arms 2 and 2' passing through the bracket will force them downwardly, and the front end of the support will be raised accordingly; or if the arms in Fig. 8 are moved forwardly, the front end of the support will be lowered accordingly.

Having thus fully described my invention, what I claim as new in the art, is:

1. In an automobile bumper support, two spring metal bars arranged near their longitudinal center to form straight upright bearing plates, then bent inwardly, then backwardly forming supporting bars spaced apart and lying parallel to the ends thereof, cross bars secured to and connecting the upright supports, said cross bars vertically adjustable upon the supports and the supports arranged for the reception and support of one, or of several of said cross bars, and brackets arranged to engage the flanges on the automobile frame beams and firmly clamp the parallel arms of the support to the frame.

2. In combination with the elements covered in claim 1, the upright part of the supporting bar punctured with equally spaced holes for the reception and adjustment of staple formed bolts, cross bars placed upon said upright bearing bodies between certain of said holes, and staple bolts passed over said cross bars and through the holes adjacent to said bars and arranged to clamp the bars firmly to the support.

3. In combination with the elements covered in claim 1, the end of one arm of the support bent U form and made to pass over and lap by the end of the other arm of the support to prevent the ends of the arms spreading apart.

4. In combination with the elements covered in claim 1, washers for use in connection with the brackets, bolts passed through the washers and the brackets arranged to firmly connect the arms with the brackets, the arms of the support passed between the washers each side of the bolts and the washers firmly clamped against the edges of the arms, beaded inclines formed upon the washers and so arranged that the clamping of the washers against the edges of the arms will force the arms firmly upon the bolts at each side thereof.

5. In combination with the elements covered in claim 1, one of the brackets having a lug extending downwardly from it, a set screw passed through said lug, a jamb nut upon said screw, a washer made to bear at one edge upon the automobile frame, and at the other edge upon the end of said bolt, said bolt designed to regulate the position of the washer relative to the frame beam, the other bracket having a body extending under the flange of the frame beam, a washer having a body positioned at right angles with the washer and adapted to engage and slide upon the lower surface of the bracket, and a bolt and washer for clamping the supporting arms upon the brackets.

6. In combination with the elements covered in claim 1, the supporting arms having vertically disposed plates at the front ends so positioned and perforated that the number and positions of the cross bars may be varied, and staples bolted upon the verticle supports for receiving and holding the cross bars upon the supports.

7. In combination with the elements covered in claim 1, the extreme back ends of the supporting bars bent in in such a manner that the movement backwardly or forwardly of these bars will raise or lower the front ends of the supporting bars and the bumper, accordingly.

Signed at Grand Rapids, Michigan, December 18, 1923.

EDWARD PARRADEE.